Patented Nov. 19, 1929

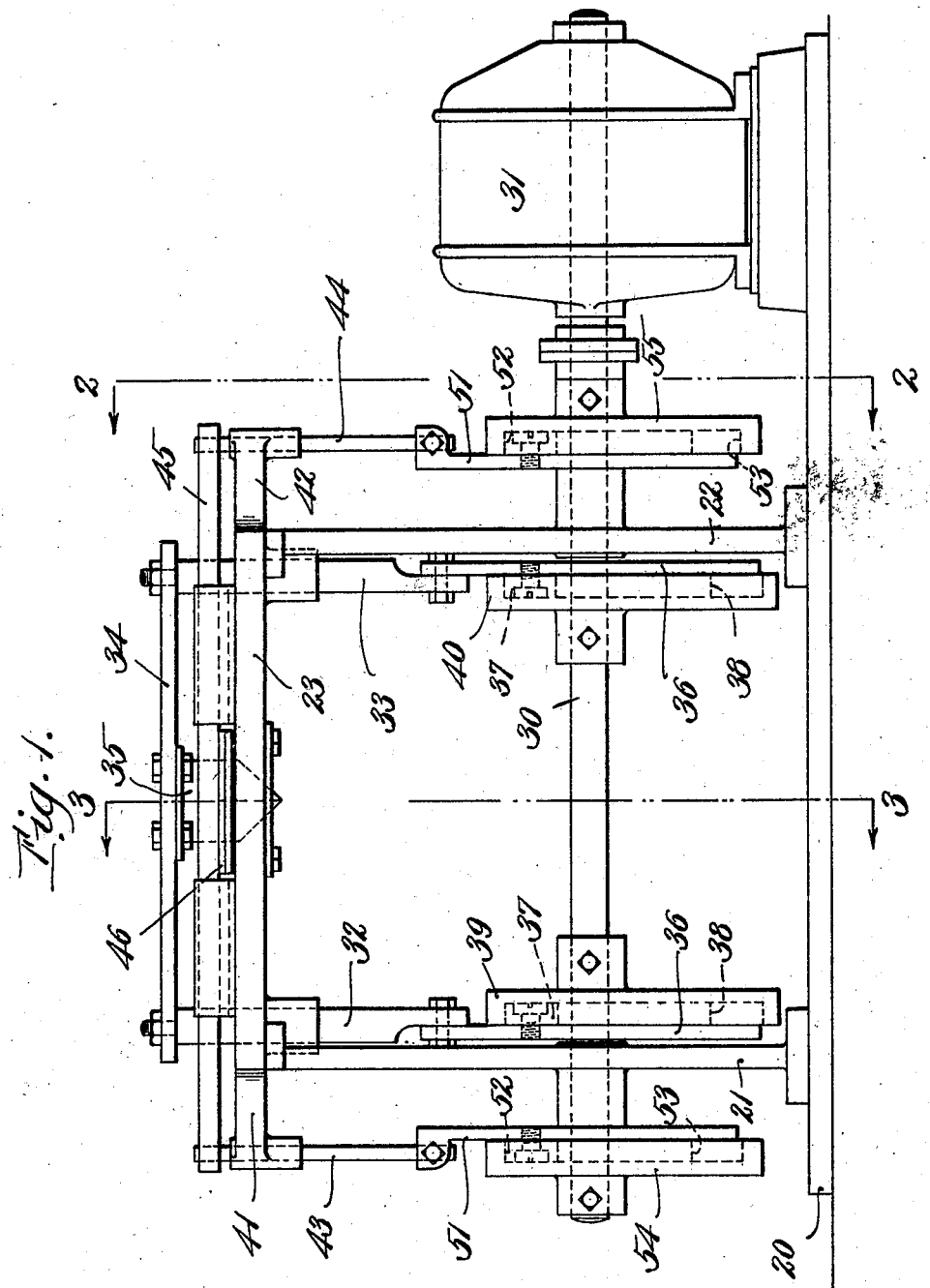

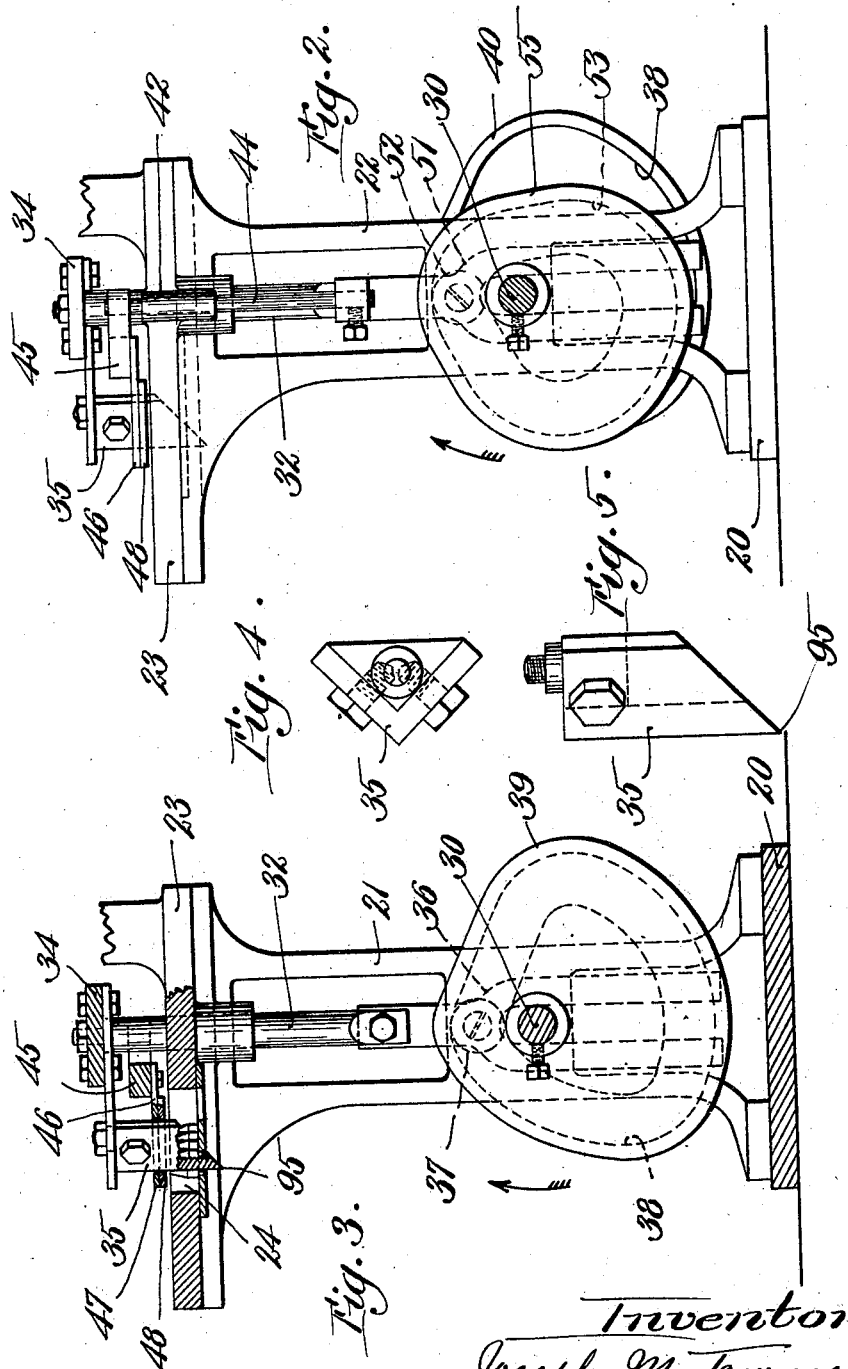

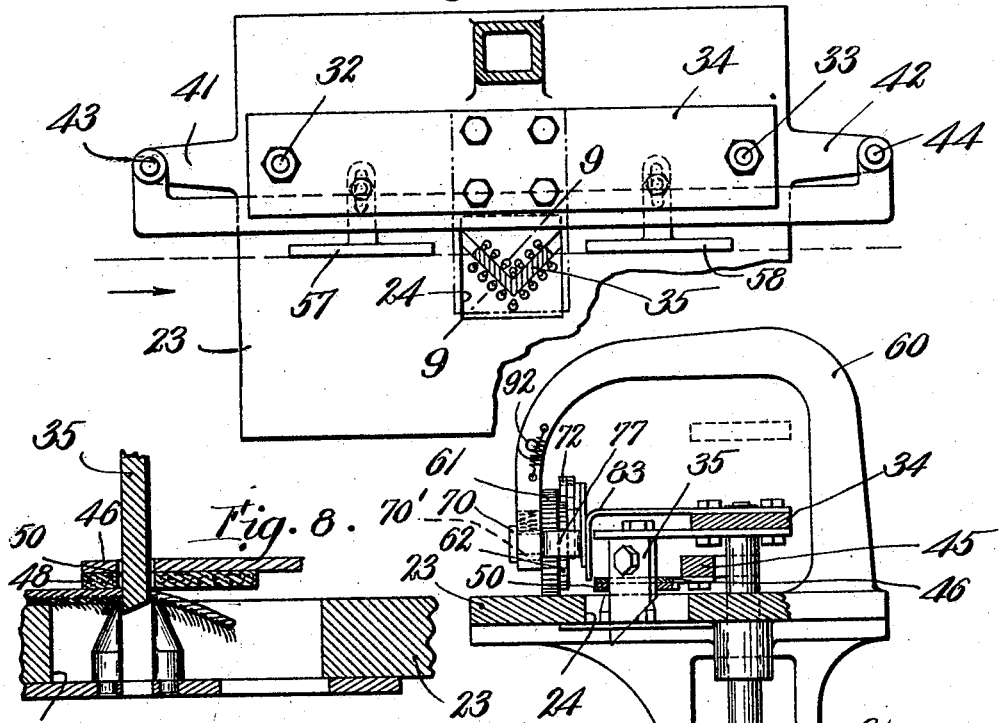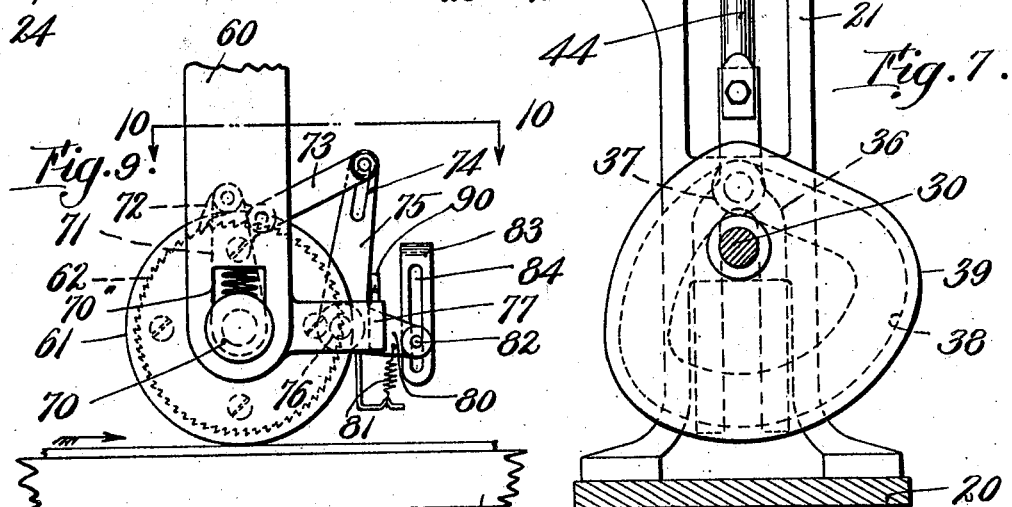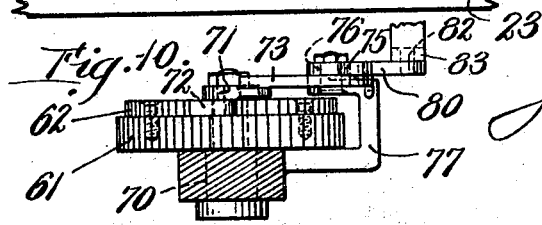

1,736,143

UNITED STATES PATENT OFFICE

JOSEPH M. TOWNSEND, OF WORCESTER, MASSACHUSETTS, ASSIGNOR OF ONE-HALF TO HIRAM T. FOLSOM, OF SOUTH HAMILTON, MASSACHUSETTS

CUTTING MACHINE

Application filed January 17, 1928. Serial No. 247,315.

This invention relates to cutting machines and with respect to certain more specific features thereof, to machines particularly adapted for making the zig-zag form of cut commonly used in the fur industry for trimming skins to be pieced.

So far as presently known, no machine has ever before been produced which would satisfactorily operate to trim the hides of fur bearing animals and this work has been done in a slow, laborious fashion by hand. It is essential that in cutting the skin, the fur should be left in an overhanging condition in order that the union of the two pieces may be concealed by the natural fur of the hide.

The present invention has for one of its objects to provide an automatically operating machine which will make the series of V-shaped cuts necessary to produce the zig-zag line of cutting common to the fur industry. While the machine shown and described herein has been designed especially for the cutting of fur, it will be obvious that the invention would have application to other materials having tufts, pile, or hair with a backing layer to be cut.

Another object is to produce a small machine, which will quickly and effectively cut the material, which may be operated by relatively unskilled operators and which shall be inexpensive to produce.

The invention accordingly consists in the various features of construction, combinations of elements and arrangements of parts which will be exemplified by the drawing and the following description and the scope of the application of which will be indicated in the appended claims.

Referring now to the drawings wherein is shown one of various possible embodiments of the invention:

Figure 1 is a view in front elevation of the improved fur cutting machine with feeding mechanism broken away to more clearly illustrate the cutting and pressing actions.

Figure 2 is a left end elevation of the machine shown in Figure 1.

Figure 3 is a vertical sectional view taken through the cutting knife.

Figures 4 and 5 are detail views of the cutting knife.

Figure 6 is a top plan view of the table showing the arrangement of points which support the material directly adjacent the knife in the cutting operation.

Figure 7 is a view in vertical section of the machine shown in Figure 1, but with the feeding mechanism included.

Figure 8 is an enlarged sectional view taken on the line 8—8 of Figure 6.

Figures 9 and 10 are views in detail of the feeding mechanism.

Referring now more particularly to the drawings, there is indicated at 20 a base plate having attached thereto a pair of suitably spaced vertical standards 21 and 22. These standards are connected at the top by a table 23 suitably apertured as at 24 to be fitted with a V-shaped series of pointed pins arranged in parallel rows and between which the knife blade enters and recedes in the operation of the machine. The standards 21 and 22 also provide journal bearings for a main driving shaft 30 which may be driven by an electric motor as indicated at 31. The table 23 provides bearings for longitudinally spaced shafts 32 and 33 which are connected at their tops by a bar or plate 34 which serves as a supporting plate for a V-shaped shearing knife 35. The shafts 32 and 33 are each extended downwardly into the form of a yoke 36, which straddles the main driving shaft. The yoke is in each instance provided with a cam roller 37 which engages in a cam groove 38 in each of a pair of operating cams 39 and 40 which are in turn fixed for rotation with the main driving shaft. Ears or lugs 41 and 42 are provided on the table 23 to serve as bearings for two vertically arranged and spaced rods 43 and 44 which are connected together at their top ends by a bar 45 which has secured to it a presser member 46, preferably constructed of a metal plate 47 having its bottom provided with a similarly shaped piece 48 of fibre or other suitable contacting material. The presser plate and the contacting material are suitably slotted as at 50 to allow relative movement of the knife blade vertically. The vertically extending rods 43 and 44 are each formed at their lower extremities with a yoke member 51 which straddles the cam driving shaft 30 and each rod is provided with a cam roller 52 which engages a cam groove 53 of each of a pair of operating cams 54 and 55.

A feeding device for the material to be cut is provided by a goose-neck 60 with its base mounted at the rear of the table 23 and its neck overhanging the cutter and presser mechanism. At the forward end of the gooseneck a presser feed roller 61 is arranged for contact with the material to be cut. This roller is adapted for intermittent rotation by means controlled from the main driving shaft and these means are timed to cause a step feed of the material after the knife has been withdrawn. These means will be later described more in detail.

The operation of the machine is as follows:—The main driving shaft, rotated clockwise as shown in Figures 2 and 3 of the drawings, causes continuous reciprocatory movement of the presser bar and knife with provision for first moving the presser member into holding contact with the mateiral to be cut and subsequent downward movement of the knife to shear the skin of the material. As the knife passes through the slot in the presser member and engages with the material which is presented to the machine with the fur or tuft side downwardly, the knife shears the resistant part of the material, that is, the skin, and the soft yieldable tuft or hair is allowed to temporarily escape from the knife between the pointed pins arranged in the double V-shaped series in the table. Owing to this construction, a V-shaped cut is produced in the hide, which is entirely definite on the skin, but which leaves the tuft or fur without being severed from the material, excepting of course such tuft or fur as is rooted directly in the cut out piece. The downward movement of the presser member is effected by the weight of the presser bar and its connecting rods when the high part of the cams 54 and 55 has passed in its rotary movement the point of contact with the cam rollers 52, thereby allowing the cam rollers to drop to the low part of the cam and the presser to contact by weight with the material to be cut. A similar action is present in effecting the downward movement of the knife, the cams 39 and 40 being so arranged relatively to the cams 54 and 55 that the high parts of the first said cams pass their cooperating cam rollers about 90° later in the rotation of the cam operating shaft. This allows the cutter to drop by weight, following the presser, when its rollers have reached the low portion of their cams, at which time, the knife has penetrated not only the groove of the presser member, but the groove that is formed by the two V-shaped series of pointed pins. The next action is the return or upward movement of the knife and presser member, which may be simultaneous or the cutter may recede somewhat faster than the presser.

The feeding device then operates by the pawl and ratchet mechanism to feed the material a definite distance along the line of cutting, so that as the presser and cutter descend the second time, another V-shaped cut is produced, which joins the one previously made. In this way, any length of material may be cut according to a pre-determined edge design.

Adjustable guides 57 and 58 are provided on the work table. The material to be cut is placed flat on the table with an edge against these guides. Inasmuch as the material as a rule does not run with regular straight line edges, but is naturally irregular, and further as it is often desired to cut a curved or irregular line of cut, some machines attempted have been unsuccessful because a line of cutting has been contemplated. The present invention in one aspect involves a single cutter with a feeding device as shown in Figures 7 and 10 of the drawings, whereby the material is given a step feed, automatically presenting successive portions of the material to the cutter in such fashion that by slight manual manipulation a zig-zag line of feed would be produced following the natural line of the pelt or any pre-determined pattern.

The feeding device comprises the overhanging arm or goose-neck 60 secured to the table 23 at the rear and having rotatively mounted therein the feed roller 61. At the back of the feed roller a ratchet wheel 62 is secured, both the roller and ratchet wheel being free to rotate on a stud shaft 70 fixed in a spring pressed box 70′ arranged in a slot 70″ in the arm. There is also arranged for rotation on the stud shaft a pawl-carrying arm 71 having a pivotally mounted pawl 72 at its free end. The arm 71 is connected by a link 73 with one arm 74 of a bell crank lever 75, the latter being rotatably mounted on a pin 76 projecting from an ear 77 of the overhanging arm 60. The other arm 80 of the bell crank lever is spring controlled as indicated at 81 to urge the lever to a position to retract the pawl 72. The arm 80 of the bell crank lever is also provided with a pin 82 adapted to engage with a depending finger 83 carried by the plate 34 which carries the cutter. This engagement is through a slot 84 in the finger so that the upward movement of the cutter carrying plate may continue to some extent before the edge at the bottom end of the slot 84 picks up the pin 82. Continued upward movement of the cutter carrying plate and its connected finger causes a rotative movement of the pawl through the link and lever mechanism just described and the ratchet is rotated a predetermined distance carrying with it the feed roller 61. The amount of this movement may be varied by adjusting the pin and slot connection between the link 73 and the lever 74. As the cutter descends the spring 81 will return the pawl to its original position against a stop 90 ready for the next step of feed. A spring 91 bearing on the block 70' creates an effective pressure of the feed roller 61 on the material to be fed and cut. A toggle-knee device 92 on the stud supporting portion of the goose-neck 60 permits of breaking the latter at that point so that the material can be introduced and also in order to allow for manual feed without obstruction to the vision.

By the mechanism just described the material is automatically advanced a distance corresponding to the width of one cut. Manual manipulation is relied upon to cause the material to follow the desired edge pattern but it will be obvious that many of the well known types of edge pattern devices might be used to cause the material to feed forwardly along some pre-determined irregular path.

One of the important advantages of the invention results from the construction of the material supporting device which cooperates with the cutting knife. By the series of pointed pins provided and arranged to contact with the hair side of the material the latter is effectively supported and a shearing reinforcement is provided while at the same time the amount of hair actually held under restraint is reduced to a minimum. It therefore follows that little, if any, of the hair actually rooted in the untrimmed body of the material is cut or shortened. All of the hair not entirely restrained at the time of the cutting will yield into the spaces provided by the tapering points of the pins.

The cutting knife is given a shearing edge from a low central point 95 upwardly at each side of said point at an angle of approximately 45°. This not only provides the usual advantage in cutting but serves to some extent to cam the hair contacting with the pin points out of contact and into the spaces hereinbefore mentioned.

Having described the invention what I claim as new is:—

1. In a machine of the character described, a frame, a movable cutter on said frame, a shearing member composed of spaced pointed elements directly cooperative with said cutter and adapted to support the material to be cut.

2. In a machine of the character described, a movable shear, a fixed shear composed of a series of fixed pointed elements cooperative with said movable shear and directly contacting with the material adjacent the line of movement of the movable shear.

3. In a machine of the character described, in combination, a work table, a knife movable toward and from said table, a shearing and supporting element fixed on said table, said element comprising a series of spaced contacting points forming a shearing wall so closely paralleling the cutting line of the knife as to share therewith in the cutting action.

4. In a machine of the character described, in combination, a movable knife and two series of tapering members arranged on opposite side respectively of the path of the knife in cutting, said members tapering into material contacting points which back up the material to be cut as it is acted upon by the knife.

5. In a machine of the character described, in combination, a knife of angular cross section having cutting edges receding from a lower central point, a shearing element cooperative therewith comprising a V-shaped arrangement of tapering teeth which contact by their points with the material to be cut and support the substance of said material, and which provide sufficient shearing edge to cause cutting of the material in cooperation with the knife, and means adapted to cause relative movement between the said knife and the shearing element.

6. In a machine of the character described, in combination, a movable cutter, a slot formed of two series of upstanding pins spaced apart at their tops, means for moving the cutter into and out of the slot to cut a hide supported on the spaced tops of said pins, one of the series of pins being positioned close to the path of the cutter so as to share in the shearing action while permitting the hair of the hide to yield into the spaces between the pin tops.

7. In a machine of the character described, in combination, a frame, a work table supported thereby, a knife supported by said frame, means for causing continuous reciprocatory movement of said knife, a shearing device supported by the table comprising two series of pointed pins respectively arranged on opposite sides of the path of movement of said knife, the upper points of said pins being adapted to contact with the work to be operated on, a presser member, means for actuating said presser member, means for feeding said work, and means for intermittently actuating said feeding means, one series of pins cooperating with the knife in its movement, to shear the work.

JOSEPH M. TOWNSEND.